US010687118B2

(12) United States Patent
Berkowitz et al.

(10) Patent No.: US 10,687,118 B2
(45) Date of Patent: Jun. 16, 2020

(54) DIGITAL CONTENT AND RESPONSE PROCESSING SYSTEM AND METHOD

(75) Inventors: Daniel Berkowitz, New York, NY (US); Christopher J. Falkner, Hoboken, NJ (US); Sheau Bao Ng, Wayland, MA (US); Myra Einstein, New York, NY (US)

(73) Assignee: NBCUniversal Media, LLC, New York, NY (US)

( * ) Notice: Subject to any disclaimer, the term of this patent is extended or adjusted under 35 U.S.C. 154(b) by 1771 days.

(21) Appl. No.: 12/916,075

(22) Filed: Oct. 29, 2010

(65) Prior Publication Data

US 2012/0110608 A1    May 3, 2012

(51) Int. Cl.
| | |
|---|---|
| *H04N 7/10* | (2006.01) |
| *H04N 7/025* | (2006.01) |
| *H04N 21/478* | (2011.01) |
| *H04N 21/658* | (2011.01) |
| *H04N 21/432* | (2011.01) |
| *H04N 21/81* | (2011.01) |
| *H04N 21/2543* | (2011.01) |
| *H04H 60/73* | (2008.01) |
| *H04H 60/63* | (2008.01) |
| *H04H 60/33* | (2008.01) |
| *H04H 60/56* | (2008.01) |

(52) U.S. Cl.
CPC . *H04N 21/47815* (2013.01); *H04N 21/25435* (2013.01); *H04N 21/4325* (2013.01); *H04N 21/6581* (2013.01); *H04N 21/812* (2013.01); *H04H 60/33* (2013.01); *H04H 60/56* (2013.01); *H04H 60/63* (2013.01); *H04H 60/73* (2013.01)

(58) Field of Classification Search
None
See application file for complete search history.

(56) References Cited

U.S. PATENT DOCUMENTS

| | | | | | |
|---|---|---|---|---|---|
| 4,710,955 | A | * | 12/1987 | Kauffman | H04N 7/165 235/382 |
| 5,539,822 | A | * | 7/1996 | Lett | A63F 13/12 348/E5.099 |
| 6,282,713 | B1 | * | 8/2001 | Kitsukawa et al. | 725/36 |
| 6,698,020 | B1 | * | 2/2004 | Zigmond | H04N 5/44513 348/E5.102 |
| 7,302,696 | B1 | * | 11/2007 | Yamamoto | 725/23 |

(Continued)

FOREIGN PATENT DOCUMENTS

WO    WO 2011009175 A1 *    1/2011    ........... G06F 3/0482

*Primary Examiner* — William J Kim
(74) *Attorney, Agent, or Firm* — Fletcher Yoder, P.C.

(57) ABSTRACT

Systems and methods are provided for allowing responses to offers displayed with digital content. The responses may be provided on a receiver system via a conventional feedback through the same distribution channel through which the content and offer were provided, or through an alternative channel, with data being transmitted from an alternative channel device to a transacting entity. For time-shifted playback, content is identified and time-adapted offers may be provided, taking into account factors such as the content, the time of play back, the date of play back, and so forth. The alternate response channel may be more suitable for time-adapted offer responses then for contemporaneously transmitted offers.

27 Claims, 4 Drawing Sheets

(56) References Cited

U.S. PATENT DOCUMENTS

| | | | | |
|---|---|---|---|---|
| 7,698,720 B2* | 4/2010 | Matz | ............... | H04H 60/16 725/34 |
| 7,802,276 B2* | 9/2010 | Swix et al. | ............... | 725/14 |
| 2001/0027559 A1* | 10/2001 | Tanabe | ............... | H04N 7/17318 725/1 |
| 2002/0111855 A1* | 8/2002 | Hammerstad | ............... | G06Q 30/02 705/14.56 |
| 2002/0144262 A1* | 10/2002 | Plotnick | ............... | G11B 27/005 725/32 |
| 2003/0012380 A1* | 1/2003 | Guggenheim | ............... | H04N 7/17309 380/266 |
| 2003/0154128 A1* | 8/2003 | Liga | ............... | G06Q 30/0208 705/14.11 |
| 2003/0163832 A1* | 8/2003 | Tsuria | ............... | H04N 5/76 725/135 |
| 2005/0119977 A1* | 6/2005 | Raciborski | ............... | G06F 21/105 705/59 |
| 2005/0177858 A1* | 8/2005 | Ueda | ............... | G11B 27/105 725/105 |
| 2006/0112018 A1* | 5/2006 | Lee | ............... | H04L 12/2803 705/59 |
| 2006/0150218 A1* | 7/2006 | Lazar | ............... | G06Q 30/02 725/60 |
| 2006/0210245 A1* | 9/2006 | McCrossan | ............... | G11B 27/105 386/213 |
| 2006/0288082 A1* | 12/2006 | Rosenberg | ............... | G06Q 20/102 709/217 |
| 2007/0022437 A1* | 1/2007 | Gerken | ............... | H04N 7/17318 725/41 |
| 2007/0050590 A1* | 3/2007 | Syed | ............... | G06F 9/4411 711/170 |
| 2007/0055999 A1* | 3/2007 | Radom | ............... | H04N 7/17318 725/86 |
| 2007/0079342 A1* | 4/2007 | Ellis | ............... | H04N 5/913 725/89 |
| 2007/0266123 A1* | 11/2007 | Johannesson | ............... | H04L 12/2812 709/220 |
| 2007/0283449 A1* | 12/2007 | Blum | ............... | H04N 5/913 726/28 |
| 2009/0216621 A1* | 8/2009 | Anderson | ............... | G06Q 30/02 705/14.7 |
| 2010/0031162 A1* | 2/2010 | Wiser | ............... | G06Q 30/0255 715/747 |
| 2010/0058423 A1* | 3/2010 | Yaussy | ............... | H04N 7/17318 725/118 |
| 2010/0077095 A1* | 3/2010 | Wong | ............... | G06Q 30/02 709/231 |
| 2010/0095323 A1* | 4/2010 | Williamson et al. | ............... | 725/32 |
| 2010/0122286 A1* | 5/2010 | Begeja | ............... | G06Q 30/02 725/34 |
| 2011/0167456 A1* | 7/2011 | Kokenos et al. | ............... | 725/60 |
| 2011/0225268 A1* | 9/2011 | Knight | ............... | H04N 7/17318 709/219 |
| 2012/0099514 A1* | 4/2012 | Bianchetti | ............... | H04N 21/41422 370/312 |
| 2012/0131098 A1* | 5/2012 | Wood | ............... | G06F 3/0482 709/203 |

* cited by examiner

DIGITAL CONTENT AND RESPONSE PROCESSING SYSTEM AND METHOD

BACKGROUND OF THE INVENTION

The present invention relates generally to the field of content and interactive offer delivery systems, and more particularly to a technique that allows for the use for multiple technologies in delivering content and offers, and for receiving feedback in response to offers.

The field of content delivery coupled with transactional offer delivery has evolved extremely rapidly in recent years. For example, advertisements transmitted via broadcast media have traditionally called for interacting parties to telephone or write to offer providers, or to visit a store, to accept offers, place orders, advance inquiries, and so forth. More recently, broadcast and other providers have offered content along with transactional offers to which target audiences could respond via the same medium used to transmit and receive the offer. That is, satellite and cable providers, for example, may display selected content along with offers for various products and services, which may be accepted and processed by a user selecting options on a handheld remote control or other interface device.

Such technologies make for highly effective marketing and processing of transactions. However, they can be limited to those receivers equipped to respond via the selected technology. Such technologies may include so-called set-top boxes, cable boxes, special receivers, special remote control devices, and so forth. For consumers who do not have such specialized devices, the acceptance of the offers, collection of additional information, and so forth may be severely curtailed, and the user may be required to resort to conventional call-in, with providers required to operate or to contract with call centers for receiving calls and processing orders.

Similarly, with the advent of time-shifted playback, the display and acceptance of offers with time-shifted content may be such that the entire offer and acceptance process becomes moot. That is, by the time content is played, in many cases, the period for acceptance of the offer may have expired, time-sensitive offers may no longer be relevant (e.g., an offer of scheduled pay-per-view content), or the offer may not be appropriate for the time slot in which the content is viewed.

There is a need, therefore, for improved techniques allowing for the distribution and processing of transactions initiated by the delivery and/or playback of content.

BRIEF DESCRIPTION OF THE INVENTION

The present invention provides novel approaches designed to respond to such needs. These approaches may be based upon the coordinated transmission of content and transactional offers via any one of a range of technologies and distribution channels. Where the target audience has available hardware and software for interacting via the same channel used for content delivery, the system permits such interaction and processing of a responding query or acceptance. Where the audience cannot interact by these channels, one or more parallel channels are available that allow for such interaction, routing the same or similar information to the transacting entity. Where time-shifted content is played back, the system allows for identification of the time-shifted content and provision of appropriate time-adapted offers. Here again, the target audience, now playing the time-adapted offers, may interact via the conventional distribution channels or alternative distribution channels, depending upon the hardware and software available to the audience, but also the ability of the distribution system to accept such responses at the times provided.

Thus, in accordance with one aspect of the invention, a system for processing digital content comprises a digital content delivery component configured to provide digital content and a transactional offer. A first processing pathway is configured to receive and process a response to the transactional offer via a first transmission channel, and a second processing pathway is configured to receive and process a response to the transactional offer via a second transmission channel. Both the first and second processing pathways transmit response data to a transacting entity without human intervention.

In accordance with another aspect of the invention, a system for processing digital content comprises a content identification component configured to identify digital content being played back on a receiver/playback system. A transactional offer delivery component is configured to transmit a transactional offer to the receiver/playback system via a first transmission channel based upon the identity of the digital content. A first processing pathway is configured to receive and process a response to the transactional offer from the receiver/playback system via the first transmission channel, while a second processing pathway is configured to receive and process a response to the transactional offer via a second transmission channel. Both the first and second processing pathways transmit response data to a transacting entity without human intervention.

The invention also provides methods for processing digital content. In accordance with one such method, digital content being played back on a receiver/playback system is identified, and a transactional offer is transmitted to the receiver/playback system via a first transmission channel based upon the identity of the digital content. A response to the transactional offer is received and processed from the receiver/playback system via a first transmission channel or a second transmission channel when the receiver/playback system is capable of providing a response via the first transmission channel. A response to the transactional offer is received and processed from the receiver/playback system via a second transmission channel when the receiver/playback system is incapable of providing a response via the first transmission. Both the first and second transmission channels transmit response data to a transacting entity without human intervention.

In another such method, digital content being played back on a receiver/playback system is identified, and an advertisement presented with the digital content is replaced with a desired advertisement based upon the identification.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
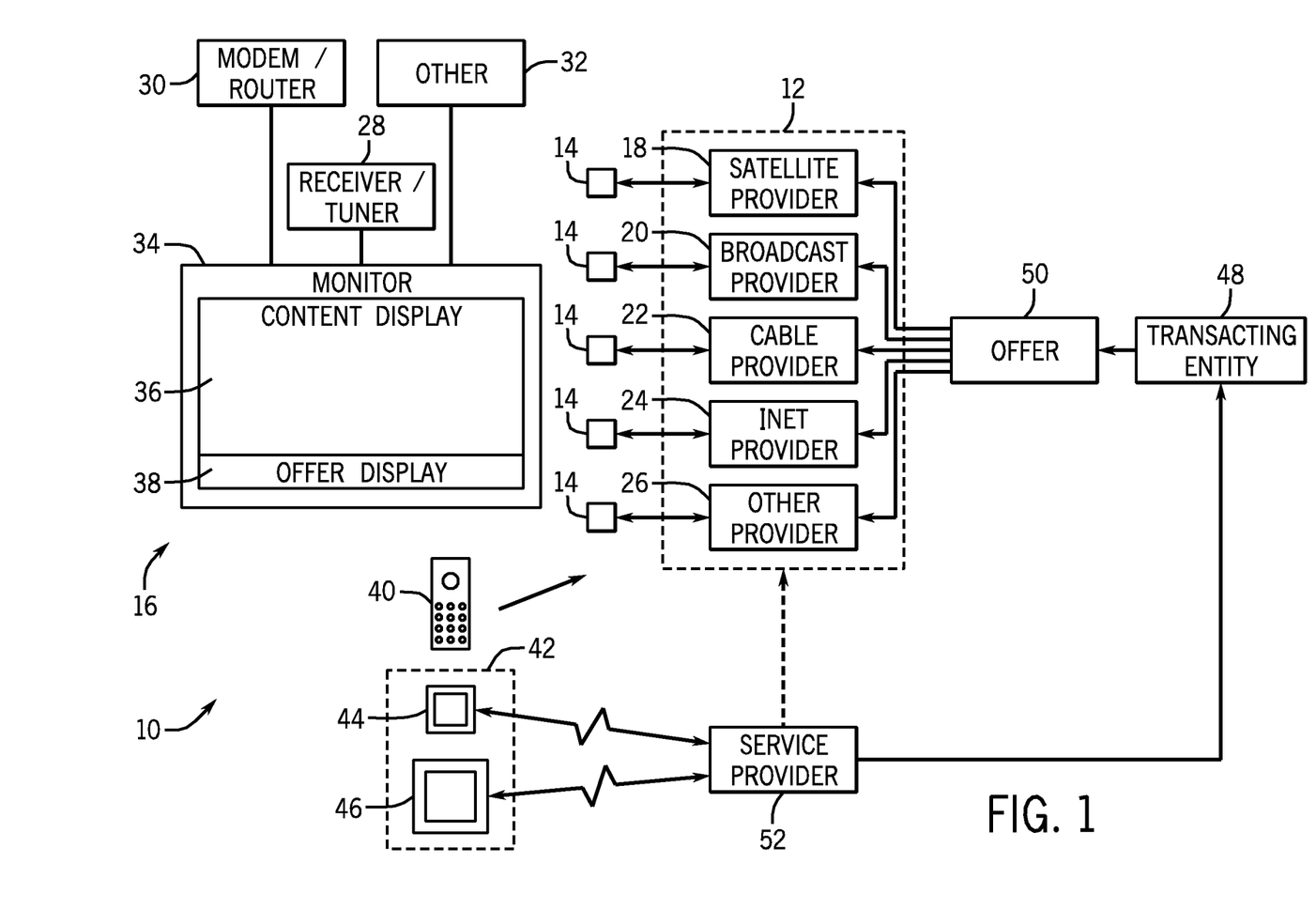
FIG. 1 is a diagrammatical representation of a content and transactional offer distribution and processing system in accordance with aspects of the present invention.

Turning now to the drawings, and referring first to FIG. 1, a content and transactional offer delivery processing system 10 is illustrated generally as including one or more distributing providers 12 that deliver content 14 potentially obtained from one or more content providers (not shown) to a target audience receiver/playback system 16. As will be appreciated by those skilled in the art, content may be provided by a host of such distributing providers. As discussed below, in practice, a single distributing provider (or content provider, or other third party or response chain) may aggregate responses across multiple "linear" distribution channels. The term "linear" distribution in the present context means content distribution that is transmitted, received and replayed without time shifting. Such distribution may be somewhat delayed by the distributor, but will typically be sent to a collective target audience rather than to individualized receivers. Just to mention a few, FIG. 1 illustrates a satellite provider 18, a broadcast provider 20, a cable provider 22 an Internet provider 24, and other providers 26. While it is presently contemplated that much of the content will be provided in real-time along with offers, the invention is not so limited. Thus, satellite, broadcast, cable, Internet and other providers may distribute content in accordance with fixed schedules to a target audience in a particular geographical area in a conventional manner. These could be provided free of charge or on a pay-per-view or contractual basis (e.g., a subscription). For example, content may be played back from optical discs, computer memory, storage contained in a set-top box or other receiver-side component, memory or storage contained at a service provider side, and so forth. Some of the content may be temporarily or permanently stored, or the content may simply be time-shifted by the user interacting with a playback device (e.g., by pausing, rewinding, fast forwarding a program).

The receiver/playback system 16 will typically include a receiver or tuner 28 that is designed to receive and process the content (and ads) from the provider or providers. As will be appreciated by those skilled in the art, such devices are typically designed based upon the technologies used by the providers in the distribution, and may include conventional television receivers, conventional tuners, satellite dishes, cable boxes, sets-top boxes, and so forth. In certain systems, a modem or router 30 may be provided to receive and process content and transactional offers through networks, such as the Internet. Other interfaces may be provided as indicated by reference numeral 32. These may include, for example, circuits that are capable of receiving and transmitting data via cellular networks, various satellite networks, and so forth. However, these devices may also include optical disc players, flash players, DVD players, DVR players, and so forth that may not have the ability to receive digital content in real time.

The system will also further include some playback or display device, such as a monitor 34. It should be noted that the monitor may include or be replaced by some other device, such as an audio device, where appropriate (e.g., for audio playback only). In the case of multi-media content, a monitor will typically include one or more speakers for coordinated playback of audio and visual content. In the illustrated embodiment, a display area may be divided into a content display 36 and an offer display 38. However, it should be noted that the invention is in no way limited to any particular arrangement of these components. Offers may be superimposed on content displays such that the original content is obscured, or they may be separated from, trail across, or interact with a display. Moreover, the offers may be displayed as an inset composed via video scaling. In general, the system may allow for some sort of user notification of an offer that is played contemporaneously with content. Here again, the content may be any suitable type, including television programming, movies, videos, web pages, and so forth. It should also be noted that, as discussed below, in certain embodiments, offers may be replaced based upon identification of the content being played back. This replacement may take place by transmission of the offers from a provider, or may be performed entirely on the receiver/playback side, such as with offers stored on the receiver/playback system. In the former case, the offers may be retrieved from a provider based upon identification of the content. It should also be noted that such offer replacement may be performed by either playing the offer contemporaneously with the content (e.g., superimposed over part of the content or over another other offer), or by temporal placement in the content (e.g., temporally splicing the offer at a desired time in the playback). The latter may be performed by analysis of the particular time in the playback based upon the content identification, where such detailed information is available.

In many cases the system 16 will be equipped with an interface device 40, such as a handheld remote control. The remote control may allow for interaction with the other components of system 16, particularly with receivers, tuners, cable boxes, set-top boxes, and so forth. Such interaction may be performed in a conventional manner, such as in response to a displayed offer. In such cases, the user may elect to place an order, summit a query, request to be contacted, and so forth. Where the system is equipped for this type of interaction, the offer may be responded to via a first processing pathway that includes the same channel used to distribute the offer. However, where such interaction is not possible, alternate channel devices 42 may be employed. In the illustrated embodiment, these are illustrated as a cellular telephone 44 and a tablet computer 46. These will typically not use the same channels and technologies as those used to distribute the content and the offer, and so could not respond to the offer in the conventional manner. The present invention provides techniques, however, for coordinating interaction through multiple channels including those used for these devices. It should be noted that the alternate channel devices may include any one of a wide range of components. In many cases, however, these will increasingly include mobile devices.

In the illustrated embodiment, a transacting entity 48 will provide an offer 50 that will be transmitted to one or more of the providers 12. The transacting entity may be any entity whatsoever, such as those offering services, products, and so forth to various target audiences. The offers may consist of text or images alone, or may be multi-media offers composed and produced for specific audiences. In many cases, the offers will be coordinated for specific content, and will bear some relation to the content. For example, offers relating to cookware may be crafted to be displayed along with, during or in coordination with content relating to cooking, food processing, and so forth. Sports memorabilia offers may be similarly coordinated with sports programming. Offers relating to pay-per-view content may be transmitted and displayed in coordination with relevant content for an audience that may be similarly interested. Many such combinations may be envisaged. The transacting entity 48 may also be one or more of the providers 12. For example, for television, satellite, cable or other programming, offers may be made by the very entities providing and/or transmitting the content itself.

Moreover, it should be noted that the transacting entity may send the same offer to each of the distributing entities. In many contexts, the content to which the offer applies may also be the same, and may thus emanate from the same content provider. Indeed, in certain embodiments, it is contemplated that the offer may be integrated into the content feed itself. For example, as discussed below, the offer for audiences without 2-way systems capable of responding to the offer by the same channel as that used for distribution may be integrated into the broadcast supplied by the content provider to the distributing provider. In addition to integrating the offer into the content, the offer may be sent to the distributing provider for transmission to the target audience separately or in parallel to the content. Thus, audiences without playback systems that can accept the separate or parallel offer data may simply playback the linear feed, requiring interaction for responding to the offer by a secondary channel, as discussed below. Audiences with 2-way response capable systems may see offers displayed over, replacing, or otherwise complementing the offer in the linear feed, and respond to the played offers by the same channel as that used for transmission and reception.

The offer 50 is transmitted by the providers 12 to the system 16 in coordination with the content. In many cases, this may occur in a conventional manner, with the content stream and offer stream being integrated such that the system 16 will receive and play both contemporaneously. As noted above, where possible, the system 16 may interact with the provider via an appropriate interface device 40 which may allow for two-way transmission of acceptance or query (more generally, "response") data. However, as noted above, the offer may be temporally spliced into the content, and this may be performed based upon analysis of where in the content the current playback is situated.

Where the system 16 is not so equipped, interaction may take place by an alternate channel utilizing one of the alternate channel devices 42. For example, the offer may display a telephone number, or an abbreviated code, a web address, and the like, the user, via the alternate channel device 42 may input this information that is transmitted to a service provided 52 for that device. The offer displayed may also include particular codes to be input via the alternate channel device that prompts the service provider 52 to decipher which offer is being responded to, and to advance the information to the transacting entity 48. Once contact is made with the service provider 52 regarding this specific offer, interactive data may be exchanged, such as queries provided by the service provider 52 as commanded by the transacting entity 48 and responses from the transacting party or user. The system thus allows for multi-channel interaction in response to offers played back with distributed content. This interaction preferably takes place without the need for human intervention on the part of any of the entities interacting with the target audience, thus alleviating (or reducing) the need for call centers and the like, unless special circumstances arise with the order or query.

Regarding the content and the offers, it should be noted that, although not specifically required, in many cases it will be desirable that the offer bear some relevance to the content being played. Thus, the analysis performed on the content may cause offers to be retrieved from a provider, or from the receiver/playback system itself, that are relevant to the currently played content. Other factors may, of course come into play, such at the location of the receiver/playback system, the demographics of the specific audience, any known histories of audience preferences and purchasing decisions, timing of playback, and so forth.

Figure 2:
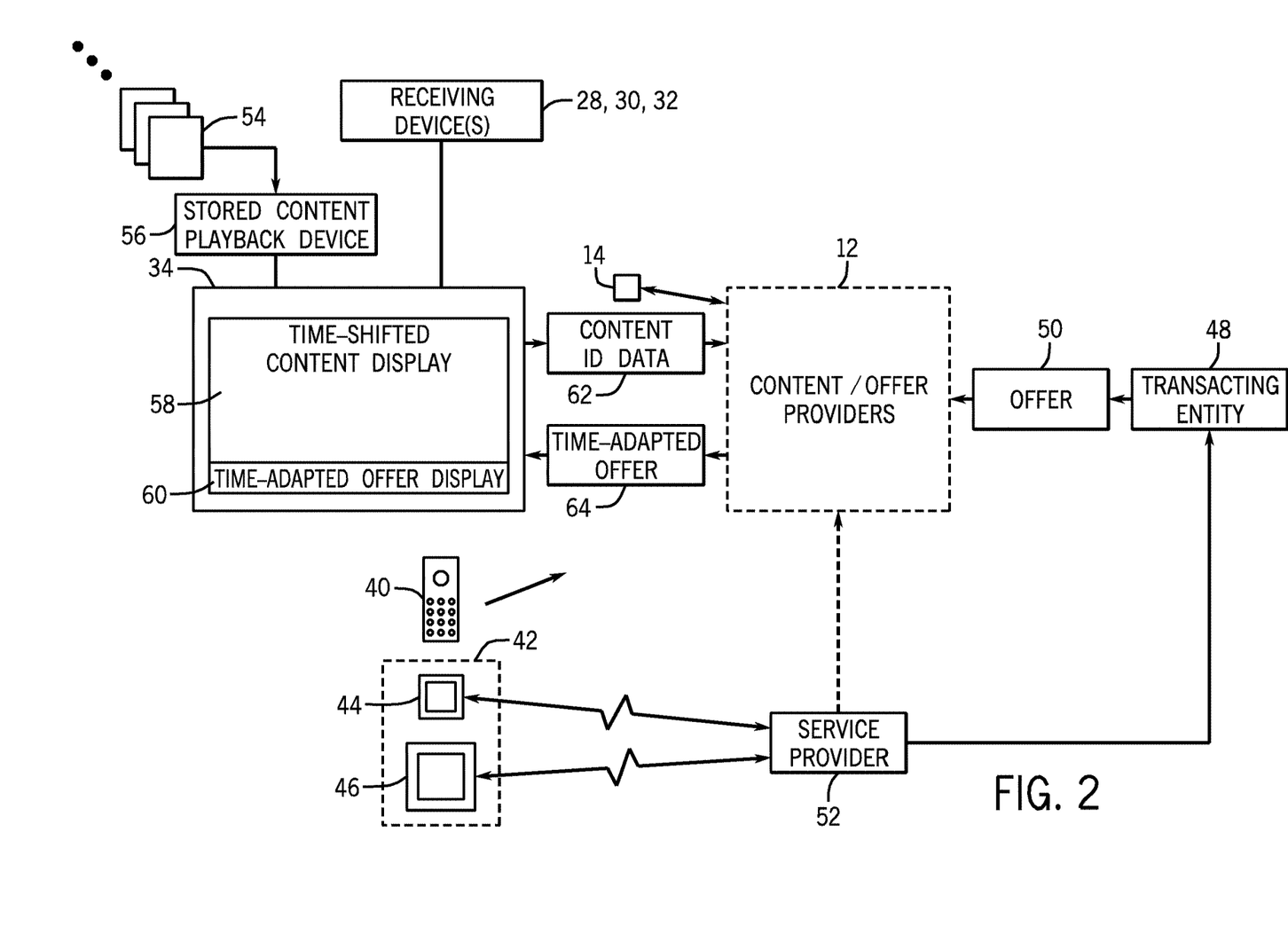
FIG. 2 is a similar diagrammatical representation of a system designed for time-adapted offer placement with corresponding mechanisms for receiving responses to such offers.

As noted above, the techniques provided by the present disclosure also allow for coordinated advertisement placement with parallel channel feedback where content is not played back in real-time. FIG. 2 illustrates a system adapted for this type of application. Components similar to those described above with respect to FIG. 1 are similarly noted and numbered. In the system of FIG. 2, however, time-shifted content is played back. The time-shifted content may be stored as indicated by reference numeral 54, or may be transmitted by one or more of the distributing providers 12. In the former case, the content may be stored on the target audience side, such as on a device connected to the monitor 34, or may be stored in the device itself. In a conventional system, for example, content 54 may be stored in a playback device 56, or in a separate memory. It should be noted that the time-shifted content may also be stored on a provider side, in response to a command by a user to store the content. Thus, content may be stored in a conventional manner by selection of an appropriate button on the interface device or remote control 40. It should also be noted, however, that the time-shifted content may be distributed by the provider and simply time-shifted during playback, such as by entering pause commands, rewind commands, fast forward commands, catch-up service, and so forth via the interface device. The time-shifted content is played back as indicated by reference numeral 58. For multi-media content, the time-shifted playback will include video and audio emissions from the system.

The system in FIG. 2 is designed for time-adapted offer display as indicated by reference numeral 60. The offer may be displayed in any desired manner, such as those described above with reference to FIG. 1. In the illustrated embodiment, a banner or region of the monitor is utilized for the time-adapted offer display. In accordance with this aspect of the technique, identification data relating to the content being played back in a time-shifted manner is transmitted to one or more providers as indicated reference numeral 62. As discussed below, this content identification data may be based upon metadata stored with the content identifying the content, but may also consist of data extracted from the content, such as via watermarks, dynamically-generated fingerprints, and so forth. The content identification data may, moreover, identify the content globally, but may also identify sectors or segments of the content, chapters of the content, individual frames of the content, and so forth. Accordingly, the provider may then extract from the content identification data information relating to the nature of the content, the point in the content being played back at a particular time, and so forth. Based upon this data, a time-adapted offer 64 may be transmitted to the viewing audience. This time-adapted offer 64 will typically be based upon an offer 50 provided by the transacting entity 48. However, the time-adapted offer may not be the same as the offer that would originally have been transmitted with and displayed with the content (if any). In particular, the time-adapted offer may make accommodation for such factors as the date of the playback, the time of day of the playback, expiration of any previous offers, initiation of any subsequent offers, discounts or premiums due to the time and date of playback, the location of the time-adapted playback, and so forth.

As in the previous embodiment, the system illustrated in FIG. 2 is adapted to permit responses by a parallel channel by use of alternate channel devices 42. These devices, which again may include cellular telephones, tablet computers, and so forth, direct data to service provider 52 which, in turn, provides the information to the transacting entity 48. It should be noted that in the case of time-shifted content and time-adapted offers, the service provider 52 may correlate the response to the content being replayed, or this may be performed by one or more of the providers 12 or by the transacting entity 48. The service provider 52 may then, under the direction of the transacting entity 48, exchange data with the user as required for processing and completing any transactions. In certain embodiments, the service provider 52 may itself be the transacting entity 48.

Figure 3:
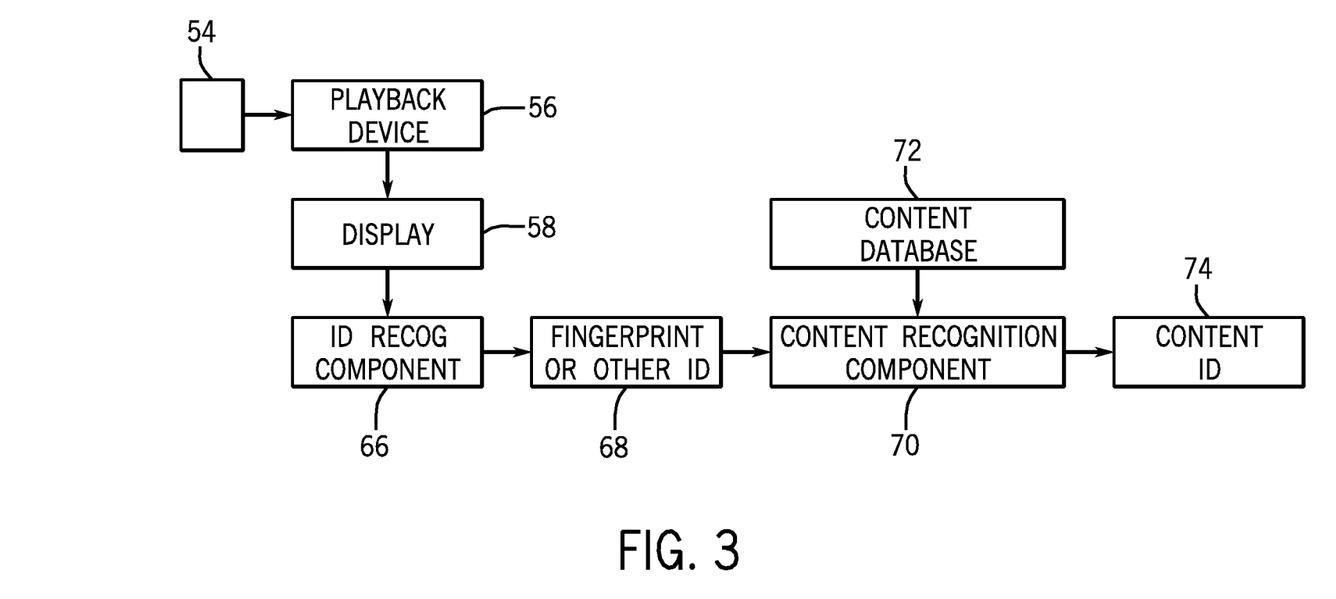
FIG. 3 is a diagrammatical representation of certain functional components used to identify content when played back in a time-shifted manner.

FIG. 3 illustrates certain components that may be included in the system of FIG. 2 for identifying time-shifted content for delivery of time-adapted offers. As illustrated, the stored or time-shifted content 54 is provided to a playback device 56. The playback device will decode the content, and provide signals for playing audio and/or video on a display 58. An identification recognition component 66 is provided for identifying the content or some aspect of the content upon which the content itself be identified. A range of scenarios may be envisaged for such components, and they may be provided in the playback device 56, in the playback monitor, or in any component of the playback system. Moreover, the identification recognition component 66 may be provided in a provider 12, in a service provider 52, in a transacting entity 48, or in one or more of these entities. The identification recognition component 66 may make use of metadata that is transmitted with or stored with the content, or may analyze the content itself for identifying information. Where metadata is relied upon, for example, this may indicate such information as titles, versions, languages, times of original transmission, location and/or identification of the content source, and so forth, as well as information relating to specific segments, chapters, or times within the content. The identification recognition component 66 may also search content for identifying factors, such as digital watermarks imbedded in the content. Where this type of indicator is not available, the component may make use of dynamically-generated content identifiers, such as digital fingerprints that reflect all or a portion of one or more segments or frames of content. Such identification information, represented by reference numeral 68 in FIG. 3, is then transmitted to a content recognition component 70. Where desired, the content recognition component 70 may draw upon information from a content database 72 that is available to cross-reference the identifying data with known data for particular content. By way of example, the content database 72 may store information identifying titles, versions, times of transmission, digital watermarks, fingerprints of individual scenes or series of scenes, and so forth that may be related back to the content. The content recognition component 70, then, develops a content identification 74 that corresponds to the identified content. The content identification 74 may then be used as the basis for adaptation or selection of offers that may be transmitted for real-time display with the time-shifted content as it is played back.

It is intended that the operation of the components that identify the content and/or any element, frames, coding or any other aspect of the content may draw upon any available information in or about the content. That is, as mentioned above, where metadata is available that describes the content, the identification may be based upon such data. This type of data may be integrated into the content, may be stored on a storage medium (e.g., optical storage disc) along with the content, or may be retrieved based upon any content identifying data. However, other data, such as embedded watermarks may be extracted from the content, or data such as fingerprints may be developed by analysis of the content by generally known techniques.

Figure 4:
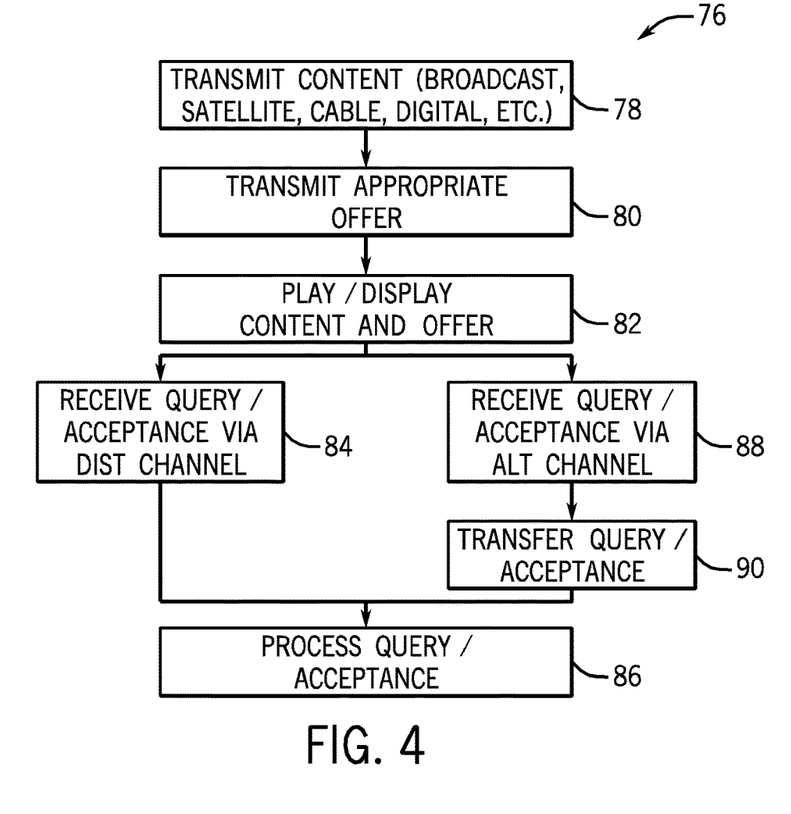
FIG. 4 is flow chart illustrating exemplary logic for distributing content and advertisements, and receiving responses to such delivery, including through parallel or alternative channels.

FIG. 4 illustrates exemplary logic for performing certain of the functions described above. The logic 76 begins with transmitting content at step 78. As noted above, the content may be transmitted in any one of a range of manners, such as by broadcast media, satellite, cable, digital transmissions, and so forth. At step 80, an offer is also transmitted. In most cases, this offer will be related in some manner to the content such that a target audience for the content will be a likely target audience for the offered goods and services. At step 82, then, the content is played or displayed by a target audience along with the offer.

It should be noted that, while FIG. 4 refers to transmission of an appropriate offer, as noted above, in practice, the offer may be retrieved from any source, or may be supplied by the receiver/playback system itself. The latter technique may be referred to as "late ad replacement", and may allow for placement of audience-side stored offers. Such replacement may be performed by a set-top box, a cable box, a receiver, or by the actual playback device (e.g., television) itself.

The logic of FIG. 4 subsequently allows for multiple paths for interactive transactions depending upon the configuration of the receiving system. In a first path, the same channel used to transmit the content and offer may be adapted for receipt of a query or acceptance of the offer. This conventional pathway is summarized by step 84. Once received, the data is used to continue the transaction and to process the query or acceptance as indicated by reference numeral 86. Here it should be noted that although the response may be transmitted via the same processing pathway used to receive the offer, in many cases the original transmission and the response may be data processed in different manners. For example, they may be transmitted by different modulation schemes, different data transmission protocols, and so forth.

On the contrary, however, when the receiver system is not adapted for interactive communication that would permit such processing, a query or acceptance may be received by an alternate channel as indicated by reference numeral 88. As noted above, this response will typically be routed through a service provider, such as a cellular telephone provider, Internet provider, or any other parallel channel provider, without human interaction except on the part of the target audience. The provider communicates the query or acceptance to the transacting entity as indicated by reference numeral 90. Thereafter, the parties may continue to process the query or acceptance as indicated by block 86. Here again, it should be noted that when the parallel or alternative pathway is used, step 86 may include the exchange of data by a service provider under the direction of the transacting entity.

Figure 5:
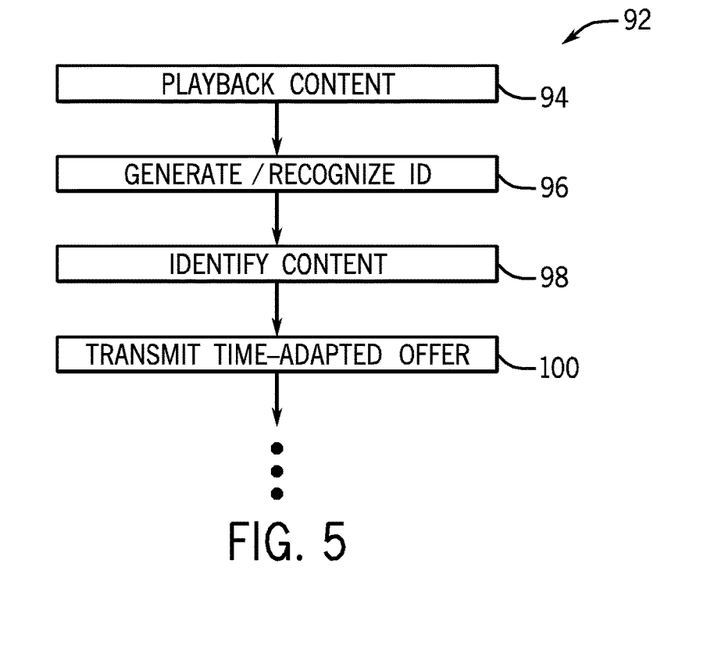
FIG. 5 is a flow chart illustrating exemplary logic for transmitting time-adapted offers when content is played back in a time-shifted manner.

FIG. 5 illustrates certain steps in exemplary logic for initially processing offers matched to time-shifted content. The logic, indicated by reference numeral 92 may begin with playing back the content as indicated at step 94. As noted above, such playback may be time-shifted insomuch as the content itself is stored either at the receiver system or elsewhere. The playback may also be time-shifted by interaction of the viewer with the receiver system, such as by pause, rewind and fast forward instructions. At step 96, then, content identifying information is generated or recognized from the content. From this information, the content itself is identified as indicated at step 98. Finally, time-adapted offers may be transmitted as indicated at step 100 based upon the time-shifted content. As also noted above, such offers may be specifically adapted for target audiences, times of viewing, dates of viewing, premiums or discounts applicable in view of the time-shifting, and so forth. Subsequent steps in the process, then, may follow those illustrated in FIG. 4 beginning with the two parallel paths created by steps 84 and 88. It should be noted, however, that in certain embodiments the parallel path beginning at step 88 may be particularly suitable for time-adapted offers insomuch as the provider of the content may not be in a position to interpret response to offers that are not transmitted in real-time. Where providers are capable of such interpretation, however, the pathway represented by step 84 may be employed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for processing digital content, comprising:
   a digital content delivery component configured to:
      provide digital content and a transactional offer to a receiver/playback system over a first transmission channel;
      after the receiver/playback system begins performing time-shifted playback of the digital content, receive, from the receiver/playback system, content identification data indicative of the digital content being performed by the receiver/playback system and a point of playback within the digital content;
      select a time-adapted transactional offer associated with the digital content being performed by the receiver/playback system based on the content identification data received from the receiver/playback system; and
      deliver the time-adapted transactional offer to the receiver/playback system based on the content identification data after the receiver/playback system begins performing the time-shifted playback of the digital content;
   a first processing pathway configured to provide the digital content and the time-adapted transactional offer to the receiver/playback system, to receive the content identification data from the receiver/playback system, and to receive and process a response to the time-adapted transactional offer via the first transmission channel; and
   a second processing pathway configured to receive and process a response to the time-adapted transactional offer via a second transmission channel; and
   wherein both the first and second processing pathways transmit response data to a transacting entity without human intervention.

2. The system of claim 1, wherein the receiver/playback system is capable of responding to the transactional offer via the first processing pathway, and wherein only the first processing pathway is presented in the time-adapted transaction offer.

3. The system of claim 1, wherein the receiver/playback system is incapable of responding to the transactional offer via the first processing pathway, and wherein only the second processing pathway is presented in the time-adapted transaction offer.

4. The system of claim 1, wherein the first processing pathway comprises a satellite transmission medium.

5. The system of claim 1, wherein the first processing pathway comprises a cable television medium.

6. The system of claim 1, wherein the second processing pathway comprises a cellular telephone network.

7. The system of claim 1, wherein a responding party may select either of the first and second processing pathways when interacting via the receiver/playback system that is capable of providing a response via the first processing pathway, and only the second processing pathway may be used by the responding party when interacting with the receiver/playback system that is incapable of providing a response via the first processing pathway.

8. The system of claim 7, wherein when the receiver/playback system is capable of providing a response via the first processing pathway, only the first processing pathway is offered on the receiver/playback system.

9. The system of claim 7, wherein when the receiver/playback system is incapable of providing a response via the first processing pathway, only the second processing pathway is offered on the receiver/playback system.

10. The system of claim 1, wherein the digital content delivery component is configured to transmit the time-adapted transactional offer based upon a time of performance of the content identification data.

11. The system of claim 1, wherein the digital content is transmitted from a remote provider and the transactional offer is stored on and provided by a component of the receiver/playback system.

12. The system of claim 1, wherein the digital content is stored on and provided by a component of the receiver/playback system and the transactional offer is transmitted from a remote provider.

13. The system of claim 1, wherein both the content and the transactional offer are transmitted from a remote provider.

14. The system of claim 1, wherein both the content and the transactional offer are stored on and provided by a component of the receiver/playback system.

15. The system of claim 1, wherein the first processing pathway comprises a television broadcast medium.

16. The system of claim 1, wherein the content identification data is indicative of a particular chapter or frame of the digital content.

17. A system for processing digital content, comprising:
   a receiver/playback system configured to identify digital content being played back on the receiver/playback system and to generate content identification data in the receiver/playback system indicative of the identified digital content being played back and a point of playback within the digital content;
   a digital content delivery system configured to receive the content identification data from the receiver/playback system, to select a time-adapted transactional offer based on the content identification data, and to transmit the time-adapted transactional offer to the receiver/playback system via a first transmission channel after the receiver/playback system begins performing the digital content, based upon the received content identification data;

a first processing pathway configured to receive and process a response to the time-adapted transactional offer from the receiver/playback system via the first transmission channel; and a second processing pathway configured to receive and process a response to the time-adapted transactional offer via a second transmission channel; and wherein both the first and second processing pathways transmit response data to a transacting entity without human intervention, and wherein the digital content delivery system transmits the time-adapted transactional offer based on the content identification data delivered by the receiver/playback system performing time-shifted playback of the digital content.

18. The system of claim 17, wherein the time-adapted transactional offer is selected based upon a date of the time-shifted playback, a time of the time-shifted playback, or both.

19. The system of claim 17, wherein the receiver/playback system is configured to:

transmit either a selection of either of the first and second processing pathways when the receiver/playback system that is capable of providing a response via the first processing pathway or a selection of the second processing pathway when the receiver/playback system is incapable of providing a response via the first processing pathway, wherein the time-adapted transactional offer comprises the selection of processing pathway transmitted by the receiver/playback system.

20. A method for processing digital content, comprising:

receiving, via a digital content delivery system, a content identification data from a receiver/playback system, wherein the content identification data is indicative of the digital content and a point of playback within the digital content;

generating, via a digital content delivery system, a time-adapted transactional offer based at least on the received content identification data;

transmitting, via a digital content delivery system, the time-adapted transactional offer to the receiver/playback system via a first transmission channel based upon the content identification data after the receiver/playback system begins time-shifted playback of the digital content;

receiving and processing, via a digital content delivery system, a response to the time-adapted transactional offer from the receiver/playback system via the first transmission channel or a second transmission channel when the receiver/playback system is capable of providing a response via the first transmission channel; and receiving and processing, via a digital content delivery system, a response to the time-adapted transactional offer from the receiver/playback system via the second transmission channel when the receiver/playback system is incapable of providing a response via the first transmission channel; and wherein both the first and second transmission channels transmit response data to a transacting entity without human intervention.

21. The method of claim 20, wherein the content identification data comprises a date of the time-shifted playback, a time of the time-shifted playback, or both.

22. The method of claim 20, wherein the content identification data is generated by the receiver/playback system.

23. The method of claim 20, wherein the content identification data is generated by an identification component remote from the receiver/playback system.

24. The method of claim 20, wherein when the receiver/playback system is capable of providing a response via the first transmission channel, only the first transmission channel is offered on the receiver/playback system through the time-adapted transactional offer.

25. The method of claim 20, wherein when the receiver/playback system is incapable of providing a response via the first transmission channel, only the second transmission channel is offered on the receiver/playback system through the time-adapted transactional offer.

26. A method for processing digital content, comprising:

identifying, in a receiver/playback system, digital content being played back on the receiver/playback system;

generating, in the receiver/playback system, content identification data indicative of the identified digital content, wherein the content identification data is indicative of the identified digital content and a point of playback within the identified digital content;

requesting, via the receiver/playback system, a time-adjusted advertisement from a digital content provider by transmitting the content identification data to the digital content provider after determining that the receiver/playback system is playing back the digital content in a time-delay manner, wherein the time-adjusted advertisement is based on the content identification data; and replacing, in the receiver/playback system, an advertisement presented with the digital content with the time-adjusted advertisement.

27. The method of claim 26, wherein a replacement advertisement is provided by the digital content provider to the receiver/playback system.

* * * * *